Patented Feb. 12, 1946

2,394,916

UNITED STATES PATENT OFFICE 2,394,916

METHODS AND COMPOSITIONS FOR KILLING WEEDS

Franklin D. Jones, Llanerch, Pa., assignor to American Chemical Paint Company, Ambler, Pa., a corporation of Pennsylvania No Drawing. Application May 31, 1945, Serial No. 596,975

22 Claims. (Cl. 167—45)

The present invention relates to methods and compositions for killing growing weeds.

The term "weed" is used in the present disclosure in its broadest sense, namely, a plant which persists in growing where it is not wanted. This use of the term is broad enough to include not only plants harmful to man or animal, such as those of the Rhus family, (poison ivy and poison oak), bindweed, and plants such as wild garlic and French weed, which have a bad effect on dairy products, but also otherwise desirable plants such as Japanese honeysuckle or lawn grasses growing on driveways.

Weeds, as a general rule, are able to grow under adverse conditions and their control presents a very difficult and troublesome problem to farmers. Prior to the research which resulted in the present invention, the most effective methods involved the use of chemicals such as common salt, chlorates, iron sulphate, ammonium sulphate, carbon disulphide, ammonium sulfamate, sodium dinitro-ortho-cresylate, sodium arsenite, and oil. All of these materials are low in unit cost, but high in cost per acre when applied in sufficient quantities to kill the weeds and they may sterilize the soil for long periods. Moreover, many of them are hazardous, being poisonous or explosive, or both. Most of them are corrosive to the equipment and difficult to handle. Moreover, they tend to kill the top of the plant without killing the roots permanently.

The primary object of the invention is to improve chemical methods for eradicating weeds in an active state of growth.

Another object of importance is to provide a wholly new class of systemic or translocated herbicides.

Another important object is to provide compositions for the purpose of eradicating growing weeds which are considerably less expensive, more economical, safer to use, and more effective than previously used chemicals.

The invention is based in part upon the observation or discovery that certain compounds, which will hereinafter be referred to as "compounds of the invention" at certain concentrations, are systemic poisons for higher plant life, and may be used as the active ingredients of herbicides.

The compounds of the invention are the phenyl, naphthyl, tetralyl and anthracene monocarboxylic aliphatic acids, their esters and salts. The ring portion of the compounds may contain one or more substituents such as halogen, hydroxyl, NH$_2$, HSO$_3$, NO$_2$, or an alkyl or alkylene group such as for instance methyl, ethyl, propyl, butyl, methoxy and ethoxy.

The term "aliphatic acids" is broad enough to include both the saturated and unsaturated acids. For practical reasons, acids having one to nine carbon atoms are preferred, but the invention is not restricted thereto. As examples of suitable acids may be mentioned formic, acetic, propionic, butyric, valeric, hexoic, acrylic, methyl acrylic, etc.

The term "esters" is broad enough to cover the esters corresponding to both the saturated and unsaturated alcohols. As examples of suitable esters may be mentioned the alkyl and alkylene esters such as methyl, ethyl, propyl, butyl, amyl, octyl, lauryl, oleyl, allyl, and isoprene esters, the esters of polyhydroxy alcohols such as the esters of ethylene glycol and of the polyethylene glycols, and the aralkyl esters such as the benzyl esters.

The polyethylene glycol ester of a desired acid may be made by heating a polyethylene glycol, such as Carbowax of molecular weight of 600 or over, with the acid in the presence of a catalyst such as sulphuric acid. The Carbowaxes are products of Carbide & Carbon Chemicals Corp., New York, N. Y.

The term "salts" is broad enough to include the alkali and alkaline earth salts such as sodium, potassium, lithium, ammonium, magnesium, calcium, the acid salts such as the sodium and potassium acid salts, the salts of other metals such as copper and iron, and the substituted organic ammonium salts such as the salts of methylamine, trimethylamine, diethylamine, monoethanolamine, triethanolamine and isopropanolamine.

The following is a representative list of compounds, which have been found to be suitable for the purposes of this invention:

Benzoic acid (phenyl formic acid), its halogen and nitro substitution products such as 2.4-dichloro-benzoic acid, 2.5-dichloro-benzoic acid, 3.5-dichloro-benzoic acid, 2.3.5-triiodo benzoic acid, 2-chloro-5-nitrobenzoic acid, and 2-bromo-3-nitrobenzoic acid, and the esters and salts of said acids.

Phenyl acetic acid, its halogen substitution products such as 2-chloro-phenyl acetic acid, 4-chloro-phenyl acetic acid, 4-bromo-phenyl acetic acid, and 4-iodo-phenyl acetic acid, and the esters and salts of said acids.

Phenyl alpha and gamma butyric acids, and their various derivatives, particularly 4-chlorophenyl alpha and gamma butyric acids, and the esters and salts of said acids.

Naphthalene-1-acetic acid, its alkyl substitution products such as 2-methyl-naphthyl-1-acetic acid and 4-methyl-naphthyl-1-acetic acid, the halogen substitution products such as 4-chloro-naphthyl-1-acetic acid, the nitro-substitution derivatives such as 4-nitro-naphthyl-1-acetic acid and the esters and salts of said acids.

1-naphthalene-alpha-propionic acid, 1-naphthalene beta-propionic acid, 1-naphthalene gamma-butyric acid, their halogen substitution products, and the esters and salts.

1-naphthoic acid, 2-naphthoic acid, the halogen substitution products, and the esters and salts.

Tetralyl-6-acetic acid, its salts and esters.

Anthracyl-acetic acid, its halogen substitution products, and the esters and salts.

The foregoing list is given by way of illustration only, and the corresponding derivatives of the corresponding unsaturated acids, e. g. acrylic acid and its homologues, may be used.

Some, but not all of the foregoing compounds are plant hormones; i. e. they serve to promote plant growth, when used in very minute concentrations in the form of solutions or dusts, or in considerably higher concentrations in the form of pastes in such materials as fats or greases (e. g. lanolin). For the purposes of the present invention, the aforementioned compounds, whether or not they are plant hormones, must be used in much higher concentrations than have ever been used for plant growth promotion. The minimum effective concentration depends upon a number of factors such as, for instance, the particular species of plant to be eradicated, the particular type of vehicle or medium, and whether or not an adjuvant is used. There is no upper limit to the concentration, except that dictated by economy.

If the active herbicidal ingredient is used in an aqueous medium without an adjuvant having penetrating properties, the lower effective limit appears to be about .1%. If an adjuvant is used, e. g. the wetting, dispersing or emulsifying agents to be mentioned, the lower limit appears to be in the neighborhood of .04%. I prefer to use at least .1% concentration, whether or not an adjuvant is employed. If the compound is used in the form of dusts, I prefer to use concentrations of .2% or over. Considerably higher concentrations are generally required, if the compounds are applied in the form of pastes, mists or aerosols.

It is to be noted at this point that the effectiveness of the compounds of the invention appears to be due in large measure to the fact that they have the property of being able to penetrate into the conducting tissue of the plant, being carried deep into the roots, killing the plant throughout. It is well known that in order for a herbicide to be fully effective, the herbicide must kill the roots as well as the top of the plant.

The compounds of the invention, therefore, appear to fit the definition of "translocated" or "systemic" herbicides. For they do not merely injure the weed at the point of contact; they take the normal path from leaves to roots within the plant and destroy it from within.

Most of the compounds of the invention are practically insoluble in water as far as usual standards of solubility are concerned. The substituted organic ammonium salts are quite soluble, but many of the other compounds have solubilities of less than 1000 parts per million of water. Those of the others, e. g. the alkali salts, which are somewhat soluble in water, tend "to salt out" in hard water. One of the problems solved by the present invention was to find a way for getting the insoluble compounds of the invention into solution or suspension, so as to render it possible to bring the necessary concentration to bear on the plant tissue.

The present invention is based in part upon the observation or discovery that wetting, dispersing and emulsifying agents in general will dissolve or suspend from 1 to 50% of their weight of the compounds of the invention and that when such solutions or suspensions are mixed with water in any proportion, a relatively stable colloidal suspension or solution is formed.

In this connection, it should be noted that generally speaking it is not possible to produce stable solutions of the water-insoluble compounds of the invention by dissolving in organic solvents those compounds that happen to be soluble in such solvents, and then diluting with water, for the addition of water ordinarily precipitates the compounds.

This invention is not limited in its broad aspects to any particular wetting, dispersing or emulsifying agent. See, for instance "A list of commercially available detergents, wetting, dispersing and emulsifying agents," by H. L. Cupples, Division of Insecticide Investigations of the United States Department of Agriculture, published June 1940, and chapter 11 on "Emulsions" of Mattiello's "Protective and Decorative Coatings," vol. IV, John Wiley & Sons, Inc., New York, 1944. Nor is the invention in its broad aspects limited to agents of either the ionic or non-ionic type, though I do prefer to use those of the non-ionic type.

Agents of the non-ionic type are those that are not affected by salts, acids, or bases, whereas those of the ionic type are affected to the extent that precipitation may occur when a salt, acid or base is added to a solution or suspension of a compound in an ionic agent.

Sulphonated vegetable oils (e. g. sulphonated castor oil, corn oil, peanut oil, soy bean oil, etc.) are examples of ionic agents that I may use. These have the advantage of cheapness, but being ionic, they have their limitations when used in the presence of acids, bases and salts. When such agents are used, it is advisable to use distilled or soft water for dilution purposes.

As previously stated, agents of the non-ionic type are preferred. This type of agent will usually dissolve or suspend from 1 to 50% of its volume or weight of the compounds of the invention, and may then be diluted with water to the desired concentration for application to the plant. The usual amounts of salts, acids, or alkalis apparently have little, if any, effect on the resulting solution or suspension.

A class of non-ionic agents that I have found particularly suitable for the purposes of this invention may be defined as follows:

"A water-soluble, non-ionic emulsifying agent containing polyether groups of the formula $R.O.(C_2H_4O)_n.R_1$, where $R$ is an alkyl, aryl, aralkyl, alkyl-aryl or acyl group of 10 carbon atoms or more, and $R_1$ is an alkyl, aryl, aralkyl, alkylaryl, or acyl group or a hydrogen atom, and $n$ is an integer greater than 2 and generally greater than 10."

Two commercial products answering to the foregoing description, which have been used in practicing the invention, are Tween #20 made by Atlas Powder Company, Wilmington, Delaware, and Triton NE, made by Rohm and Haas Co., Philadelphia, Pennsylvania. Tween is a polyoxyalkylene derivative of sorbitan monolaurate, and Triton NE is a polyalkylene ether alcohol.

Similarly useful are the polyethylene glycols of molecular weight of 1500 or more, obtainable on the market under the trade-mark Carbowax.

The following are several illustrative examples of herbicidal compositions made according to the teachings of the present invention:

Example I

| | Parts |
|---|---|
| Phenyl acetic acid | 5 |
| Tween #20 or Triton NE | 25 |
| Water | 970 |

Example II

Naphthyl-1-acetic acid is used instead of the phenyl acetic acid of Example I.

Example III

| | Parts |
|---|---|
| Naphthyl-1-butyric acid | 5 |
| Sulphonated corn or castor oil | 50 |
| Water | 945 |

Example IV

Naphthyl-1-acetic acid or its ethyl ester is used in Example III instead of the naphthyl butyric acid.

Example V

Phenyl acetic acid or its methyl ester is used in Example III instead of the napthyl butyric acid.

Example VI

| | Parts |
|---|---|
| Naphthyl-1-acetic acid | 2 |
| Triton NE | 20 |
| Citric acid | 10 |
| Water | 968 |

Example VII

The naphthyl acetic acid is replaced by anthracene acetic acid.

Example VIII

| | Parts |
|---|---|
| Potassium phenyl acetate | 4 |
| Sodium lauryl sulphate | 1 |
| Water | 995 |

In each of the foregoing examples, the active ingredient is first dissolved in the wetting, dispersing or emulsifying agent to make up a stock solution. The water may be added at any time before the composition is to be used.

It is noted that in certain of the examples, citric acid was added. The purpose is to lower the pH, as it has been found that plants take up such chemicals much more readily at a pH of 4 or less. Any acid may be used, but solid acids as tartaric, succinic, citric, malic, maleic, sulfamic and fumaric are generally more convenient to use for this purpose than the liquid acids. The acid may be added at any time before using the composition, but it preferably forms part of the stock solution.

In the case of the water-soluble compounds such as the alkali salts and the substituted organic ammonium salts, an aqueous solution of the desired concentration may be made up directly. A wetting agent or a surface tension depressing agent may be added to facilitate penetration. Such agents also appear to step up the herbicidal effect, thereby rendering it possible to use smaller concentrations.

Example IX

| | Parts |
|---|---|
| Substituted organic ammonium salt | 1 to 2 |
| Water | 993 to 998 |
| Wetting agent | 1 to 5 |

The compounds of the invention may also be incorporated into dry compositions containing other active or inactive ingredients. For instance, a suitable dry composition may contain any one or more of the compounds of the invention, a wetting agent in dry form such as Alkanol (sodium tetrahydronaphthalenesulphonate or sodium alkylnaphthalenesulphonate), and an acidifying agent, such as citric, tartaric, succinic, malic, maleic, fumaric and sulfamic acid. The purpose of the acid is to reduce the pH to 4 or less, at which pH the herbicidal compositions are more readily absorbed by the plant. An acid, either solid or liquid, may also be added to the wet compositions. It is advantageous in many cases to add a buffer salt (a salt of any weak acid or base), particularly if the composition contains sulfamic acid.

The following are a few examples of dry compositions suitable for killing weeds:

Example X

| | Parts |
|---|---|
| Any of the free acids of the invention | 1 |
| Aerosol (American Cyanamid & Chemical Corp., New York), or Santomerse (Monsanto Chemical Co., St. Louis, Missouri) | 1 |
| Talc | 98 |

Example XI

| | Parts |
|---|---|
| Any ester of the invention | 2 |
| Oil (light motor grade) | 3 |
| Talc | 95 |

The ingredients in each of the foregoing examples are thoroughly ground together in a pebble mill. The resulting compositions are intended to be applied to the leaves of the weeds in the form of dusts.

The following are examples of dry compositions which may be mixed with water, and applied to the weeds by spraying:

Example XII

| | Parts |
|---|---|
| A water soluble salt or ester of any of the acids previously mentioned | 2 |
| Filler such as sugar or talc | 1 |
| Dry wetting agent such as Carbowax 4000 | 1 |

The ingredients are mixed and ground to a powder. The powdered mixture may be sold for use as such. The user need only mix one part of the dry powder with 250 to 500 parts of water to form a solution suitable for spraying.

Example XIII

| | Parts |
|---|---|
| Any of the free acids of the invention | 1 |
| Alkali carbonate, e. g. sodium carbonate | 1 |
| Non-ionic or alkali-stable wetting agent such as Carbowax 4000 | 1 |
| Talc or other filler | 1 |

The ingredients are mixed and ground to a powder, which may be sold as such. To prepare for use, the powder is mixed with 125 to 250 times as much water. The alkali carbonate reacts with the acid to form a water soluble salt.

The compositions of the invention lend themselves particularly to application to weeds in the form of fine mists or aerosols. If they are to be applied in this manner, they should be dissolved in a very volatile solvent such as fluorinated hydrocarbons such as tetrafluormethane, halogenated hydrocarbons containing both chlorine and fluorine such as dichlorodifluoromethane (Freon), or dimethyl ether.

The following are a few examples of compounds suitable for application in the form of mists or aerosols:

Example XIV

| | Per cent |
|---|---|
| Any compound of invention | 1 |
| Dimethyl ether | 90 |
| Mutual solvent such as cyclohexanone | 9 |

Example XV

| | Per cent |
|---|---|
| Any compound of invention | 1 |
| Freon | 89 |
| Mutual solvent | 10 |

The compositions made in accordance with the invention may be applied for their intended purpose in several different ways.

The most advantageous and presently preferred way is to spray the composition on the leaves of the plant to be exterminated. This method takes advantage of the normal path taken by naturally-occurring hormones.

Another method is to cut off the top of the stem of the plant, and then bend the stem over into a solution of the herbicide. The plant absorbs sufficient herbicide in this manner to kill itself.

I am not precluded from using the herbicides of the invention in other ways, as by applying them to the roots.

At this point, it is to be noted that the effectiveness of a herbicide can be considerably increased by applying it on a sunny day when the temperature is over 70° F.

It is also to be noted that the compositions of the invention have an accumulative effect on plants, so that by spraying a plant with a composition of half strength on two occasions, two or three weeks apart, the plant will be killed, though the first application itself is not sufficient.

The compositions of this invention are much more effective than previously-used chemicals, and are capable of killing weeds, which are noxious, insidious and persistent like poison ivy in a period of two to three weeks. They can be applied to large areas at relatively small expense and have the added advantage that unlike prior herbicides they do not render the area sterile. Furthermore, they are not harmful to either man or beast, and can be readily handled without any danger.

In conclusion, it is to be understood that the examples have been given for illustrative purposes only, and that the invention is not to be limited thereto. For instance, 2.5-dichloro-benzoic acid or any of the other compounds mentioned in the disclosure must be used in addition to or instead of the compounds specifically included in Examples I to VIII.

This application is a continuation-in-part of my prior application Serial No. 527,150, filed March 18, 1944.

I claim:

1. A method for killing weeds in an active state of growth, which consists in applying to the weeds a substance selected from the group consisting of phenyl, naphthyl, tetralyl, and anthracene monocarboxylic aliphatic acids, their salts and esters, in a concentration of at least about .1% by weight.

2. A method for killing weeds in an active state of growth, which consists in applying to the leaves of the weeds a substance selected from the group consisting of phenyl, naphthyl, tetralyl, and anthracene monocarboxylic aliphatic acids, their salts and esters, in a concentration of at least about .1% by weight.

3. A method for killing weeds in an active state of growth, which consists in applying to the leaves of the weeds an aqueous solution of a substance selected from the group consisting of phenyl, naphthyl, tetralyl, and anthracene monocarboxylic aliphatic acids, their salts and esters, in a concentration of at least about .1% by weight.

4. A method for killing weeds in an active state of growth, which consists in applying to the leaves of the weeds a composition containing an active ingredient, water and a water-soluble, non-ionic wetting, dispersing and emulsifying agent, said active ingredient being selected from the group consisting of phenyl, naphthyl, tetralyl, and anthracene monocarboxylic aliphatic acids, their salts and esters, and comprising at least about .04% of said composition.

5. A method for killing weeds in an active state of growth, which consists in applying to the leaves of the weeds a composition containing a substance selected from the group consisting of phenyl, naphthyl, tetralyl, and anthracene monocarboxylic aliphatic acids, their salts and esters, and comprising at least about .04% of the weight of the composition, water and a water-soluble, non-ionic emulsifying agent containing polyether groups of the formula $R.O.(C_2H_4O)_n.R_1$, where R is an alkyl, aryl, aralkyl, alkyl-aryl, or acyl group of at least 10 carbon atoms, and $R_1$ is an alkyl, aryl, aralkyl, alkyl-aryl or acyl group or a hydrogen atom, and $n$ is an integer greater than 2.

6. A method for killing weeds in an active state of growth, which consists in applying to the leaves of the weeds a composition containing phenyl acetic acid, and a wetting, dispersing and emulsifying agent, the phenyl acetic acid comprising at least about .04% of the composition.

7. A method for killing weeds in an active state of growth, which consists in applying to the leaves of the weeds a composition containing phenyl acetic acid, water and a water-soluble non-ionic wetting, dispersing and emulsifying agent, the phenyl acetic acid comprising at least about .04% of the composition.

8. A method for killing weeds in an active state of growth, which consists in applying to the leaves of the weeds a composition containing naphthyl-1-acetic acid, and a wetting, dispersing and emulsifying agent, the naphthyl-1-acetic acid comprising at least about .04% of the composition.

9. A method for killing weeds in an active state of growth, which consists in applying to the leaves of the weeds a composition containing naphthyl-1-acetic acid, water and a water-soluble non-ionic wetting, dispersing and emulsifying agent, the naphthyl-1-acetic acid comprising at least about .04% of the composition.

10. A method for killing weeds in an active state of growth, which consists in applying to the leaves of the weeds a composition containing dichloro-benzoic acid, and a wetting, dispersing and emulsifying agent, the dichloro-benzoic acid comprising at least about .04% of the composition.

11. A method for killing weeds in an active state of growth, which consists in applying to the leaves of the weeds a composition containing dichloro-benzoic acid, water and a water-soluble non-ionic wetting, dispersing and emulsifying agent, the dichloro-benzoic acid comprising at least about .04% of the composition.

12. A composition for killing weeds in an active state of growth, said composition containing an active ingredient, water and a wetting, dispersing and emulsifying agent, the active ingredient being selected from the group consisting of phenyl, naphthyl, tetralyl, and anthracene monocarboxylic aliphatic acids, their salts and esters and comprising at least about .04% by weight of said composition.

13. A composition for killing weeds in an active state of growth, said composition containing an active ingredient, water and a water-soluble, non-ionic wetting, dispersing and emulsifying agent, the active ingredient being selected from the group consisting of phenyl, naphthyl, tetralyl, and anthracene monocarboxylic aliphatic acids, their salts and esters and comprising at least about .04% by weight of said composition.

14. A composition for killing weeds in an active state of growth, said composition containing a substance selected from the group consisting of phenyl, naphthyl, tetralyl, and anthracene monocarboxylic aliphatic acids, their salts and esters, and comprising at least about .04% of the weight of the composition, water and a water-soluble, non-ionic emulsifying agent containing polyether groups of the formula $R.O.(C_2H_4O)_n.R_1$, where R is an alkyl, aryl, aralkyl, alkyl-aryl, or acyl group of at least 10 carbon atoms, and $R_1$ is an alkyl, aryl, aralkyl, alkyl-aryl or acyl group or a hydrogen atom, and $n$ is an integer greater than 2.

15. A composition for killing weeds in an active state of growth, said composition containing an active ingredient, water and a wetting, dispersing and emulsifying agent, the active ingredient being phenyl acetic acid and comprising at least about .04% by weight of said composition.

16. A composition for killing weeds in an active state of growth, said composition containing an active ingredient, water and a wetting, dispersing and emulsifying agent, the active ingredient being naphthyl-1-acetic acid and comprising at least about .04% by weight of said composition.

17. A composition for killing weeds in an active state of growth, said composition containing an active ingredient, water and a wetting, dispersing and emulsifying agent, the active ingredient being dichloro-benzoic acid and comprising at least about .04% by weight of said composition.

18. A composition containing a substance selected from the group consisting of phenyl, naphthyl, tetralyl, and anthracene monocarboxylic acids, their salts and esters, mixed with a wetting, dispersing and emulsifying agent, and comprising at least one per cent of the composition, said composition being capable of being mixed with water to form a solution containing at least .04% by weight of said substance and having herbicidal properties.

19. A composition containing phenyl acetic acid mixed with a wetting, dispersing and emulsifying agent and comprising at least one per cent of the composition, said composition being capable of being mixed with water to form a solution containing at least .04% by weight of said phenyl acetic acid and having herbicidal properties.

20. A composition containing naphthyl-1-acetic acid mixed with a wetting, dispersing and emulsifying agent and comprising at least one per cent of the composition, said composition being capable of being mixed with water to form a solution containing at least .04% by weight of said naphthyl-1-acetic acid and having herbicidal properties.

21. A composition containing dichloro-benzoic acid mixed with a wetting, dispersing and emulsifying agent and comprising at least one per cent of the composition, said composition being capable of being mixed with water to form a solution containing at least .04% by weight of said dichloro-benzoic acid and having herbicidal properties.

22. A method for killing weeds in an active state of growth, which consists in applying to the leaves of the weeds a composition containing an active ingredient, water and a wetting, dispersing and emulsifying agent, said active ingredient being selected from the group consisting of phenyl, naphthyl, tetralyl, and anthracene monocarboxylic acids, their salts and esters, in a concentration of at least .04% by weight.

FRANKLIN D. JONES.